United States Patent [19]

Risberg

[11] 4,216,367
[45] Aug. 5, 1980

[54] WIRELESS REMOTE CONTROL FOR ELECTRIC WELDER

[75] Inventor: Robert L. Risberg, Brookfield, Wis.

[73] Assignee: Miller Electric Manufacturing Company, Appleton, Wis.

[21] Appl. No.: 897,610

[22] Filed: Apr. 18, 1978

[51] Int. Cl.² .............................................. B23K 9/10
[52] U.S. Cl. .................................................. 219/132
[58] Field of Search ................. 219/132, 130.1, 130.32

[56] References Cited

U.S. PATENT DOCUMENTS

| | | | |
|---|---|---|---|
| 2,060,772 | 11/1936 | Moffett | 219/132 |
| 2,189,603 | 2/1940 | Graham | 219/132 |
| 2,438,634 | 3/1948 | Farrow | 219/132 |
| 2,526,597 | 10/1950 | Winslow | 219/132 |
| 3,530,359 | 9/1970 | Grist | 219/130.32 |
| 4,051,344 | 9/1977 | Robbins | 219/130.1 |

FOREIGN PATENT DOCUMENTS

| | | | |
|---|---|---|---|
| 43-16214 | 7/1968 | Japan | 219/132 |
| 1006808 | 10/1965 | United Kingdom | 219/132 |

*Primary Examiner*—B. A. Reynolds
*Assistant Examiner*—Clifford C. Shaw
*Attorney, Agent, or Firm*—Sughrue, Rothwell, Mion, Zinn and Macpeak

[57] ABSTRACT

The position of the main rheostat on an arc welding machine determines the pre-set welding current. An operator, working at a location remote from the welding machine, carries a pen-type adjustable rheostat which carries calibrations indicative of various percentages of the pre-set welding current. There are no extra electrical connections, such as wires, between the remote rheostat and the welding machine. If the operator wishes to change the magnitude of the welding current, he need not return to the main rheostat at the welding machine, but instead merely sets the remote rheostat for the percentage of pre-set current desired, and inserts the remote rheostat between the electrode holder and the workpiece. The minimum resistance of the remote rheostat is sufficiently high to prevent an arc from being struck. A current transformer in the welding machine senses the output (calibrating) current flowing through the welding cable. A signal proportional to the desired welding current reference is compared with a stored value of the present welding current reference to produce a control signal which is fed to an up/down counter whose output is the stored welding current reference. The welding current reference is thus either increased or decreased until it reaches the value called for by the adjustable remote rheostat. After a few seconds, the operator removes the remote rheostat from the electrode holder, and the welding current reference will now be at the precise desired value to produce the desired welding current.

12 Claims, 13 Drawing Figures

FIG. 4
SCR CONTROL CIRCUIT 24

WIRELESS REMOTE CONTROL FOR ELECTRIC WELDER

BACKGROUND OF THE INVENTION

1. Field of the Invention

This invention relates generally to the field of remote control devices for electric welders and, more particularly, to an improved remote control device for electric arc welders wherein the welding current can be remotely readjusted to a precise percentage of the welding machine's pre-set welding current, there are no additional wires or electrical connections required between the remote rheostat and the welding machine, and there are no moving parts, such as electric motors.

2. Description of the Prior Art

Remote control devices for electric welding machines are broadly known in the prior art.

However, these prior art devices suffer from one or more of the following defects: (1) they require additional electric wires or other electrical connections between the remote location and the welding machine; (2) they require moving parts, such as electric motors; and (3) they do not permit the operator at a remote location to set the welding current to a precise value, but rather merely permit the operator to change the welding current in either direction before he operates a switch to stop the change.

The following patents are exemplary of such prior art remote control systems and devices: U.S. Pat. Nos. 2,734,116; 2,872,566; 3,041,526; 3,402,341; 3,477,005; and 3,811,085.

SUMMARY OF THE INVENTION

Therefore, the broad object of the invention is to provide a reliable remote control via the welding cable of an electric welding machine wherein no extra wires are required between the remote location and the welding machine.

Another object of the invention is to provide a remote control device for an electric welding machine wherein an operator at a location remote from the welding machine can adjust the welding current to a precise percentage of the pre-set welding current.

A further object of the invention is to provide a remote control system for an electric welding machine wherein the welding current may be adjusted at a remote location without the requirement for moving parts, such as electric motors.

In general, the above objects are achieved by providing the welding machine operator with a pen-type, manually variable rheostat configured so that one end can be clamped in the electrode holder and so that the other end can make electrical contact with the workpiece. The operator pre-sets the welding current by adjusting the main rheostat at the welding machine. The operator's rheostat is calibrated in percentages of the pre-set welding current. When the operator is welding at a location remote from the welding machine and wishes to change the welding current, he merely adjusts the operator's rheostat to the desired percentage of the pre-set current, inserts the operator's rheostat in the holder so that it is electrically in series with the welding cable and workpiece, and then waits a few seconds until the electronic circuits in the welding machine are operated to adjust the welding current reference to the desired new value.

When the operator's rheostat is thus connected, a current sensor in the welding machine senses the welding machine's output current as a calibrating current and compares it with the previously set welding current reference whose value has been stored in electronic circuits in the welding machine. After a slight delay, electronic circuits in the welding machine are operated to adjust the current reference of the welding machine to the new desired value of welding current. The operator then removes his rheostat from the electrode holder and is ready to weld with the new value of welding current reference.

The calibration current flows through the welding cable itself. No extra wires are required between the operator's rheostat and the welding machine, and no moving parts are required in the welding machine to adjust the welding current. Furthermore, the operator can adjust the welding current to a precise percentage of the current value which has been pre-set in the welding machine, thereby eliminating the need for the operator to use a trial-and-error procedure for determining the correct welding current for a particular welding job.

The invention is particularly useful when welding in a shipyard environment where there are typically great distances between the welding machine and the remote welding location. This invention eliminates the extremely long extra cables which were required with prior art remote control systems.

BRIEF DESCRIPTION OF THE DRAWINGS

FIGS. 3 (A and B) is a schematic circuit diagram illustrating the details of the logic circuit of FIGS. 1 and 2.

FIGS. 4 (A and B) is a schematic circuit diagram showing one form of the control circuit of FIGS. 1-3.

DETAILED DESCRIPTION OF THE PREFERRED EMBODIMENTS

Figures 1, 5:
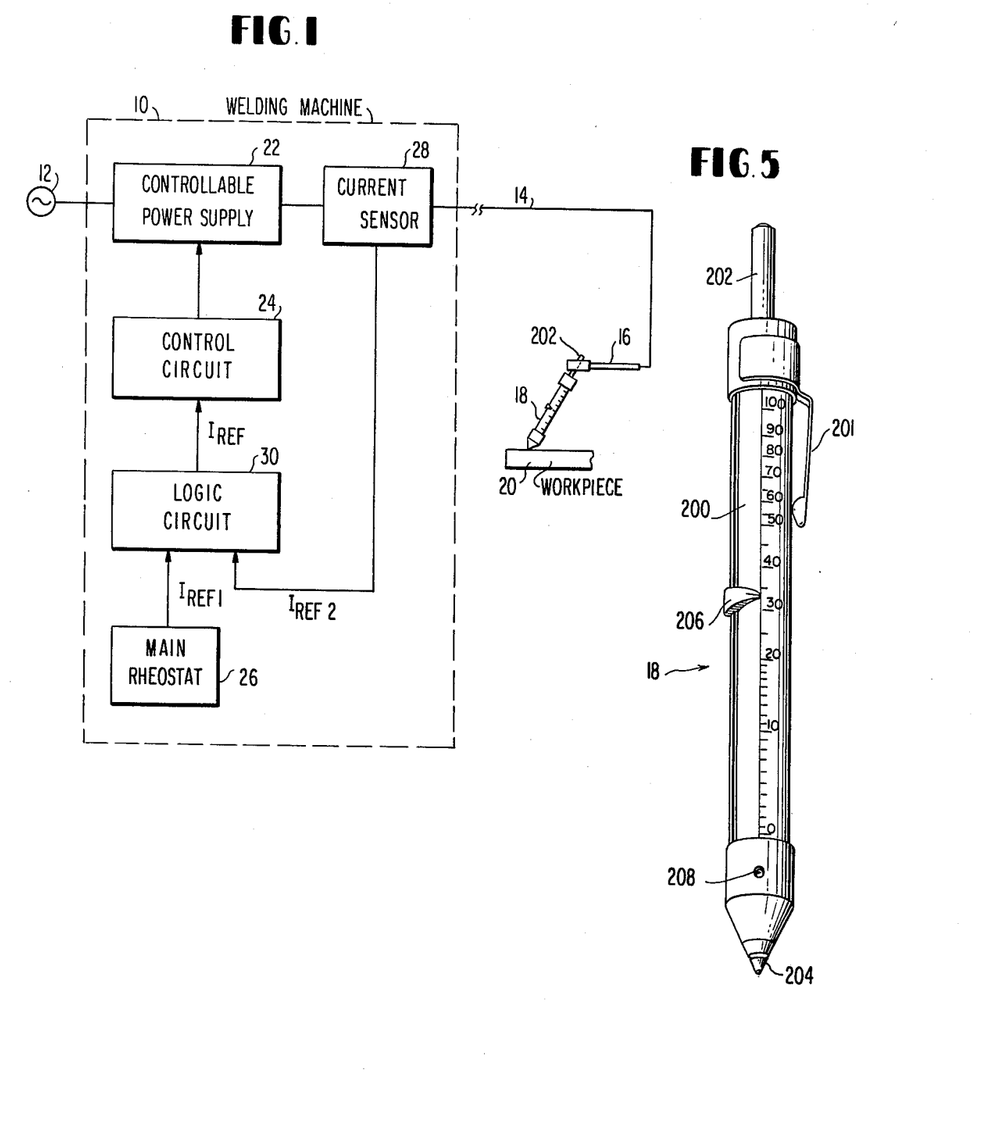
FIG. 1 is a functional block diagram illustrating the operation of the invention as applied to an arc welding machine.
FIG. 5 is a perspective view of an operator's rheostat embodying the invention.

FIG. 1 is a functional block diagram illustrating the basic concept of the invention.

A welding machine 10 is connected to an A.C. power source 12. The output of the machine is connected to a welding cable 14 which may be extended to a location remote from the welding machine and terminated in an electrode holder 16. The operator at the remote location carries in his pocket an operator's rheostat 18 which does not require any control wires leading back to the welding machine. As shown in FIG. 1, in order to implement the novel remote control of this invention, the operator merely places the rheostat 18 between the electrode holder 16 and the workpiece 20.

The welding machine itself consists of a controllable power supply 22 of the SCR type, for example, for supplying a controllable welding current, and a control circuit 24 for producing signals which control the magnitude of the current supplied by the power supply 22. Other types of controllable power supplies are magnetic amplifiers, saturable reactors, etc.

A manually adjustable main rheostat 26 at the welding machine is used by the operator to pre-set the maximum magnitude of the welding current.

When the rheostat 18 is connected as shown in FIG. 1, a current sensor 28 senses the output current of the welding machine as a calibrating current and produces a signal $I_{REF2}$ indicative of the value of the welding current reference corresponding to the setting of the operator's rheostat 18 (i.e., the desired welding current). This signal is processed in logic circuit 30 with a signal $I_{REF1}$ indicative of the setting of the main rheostat 26 and with the stored value of the previous welding current reference to produce a command signal $I_{REF}$ which is sent to control circuit 24 which in turn controls the power supply 22 to cause it precisely to produce a welding current having the desired value corresponding to that called for by the operator's rheostat 18.

As will be described in more detail below, the operator's rheostat contains external calibration marks representing percentages of the pre-set welding current determined by the setting of the main rheostat 26.

Figure 2:
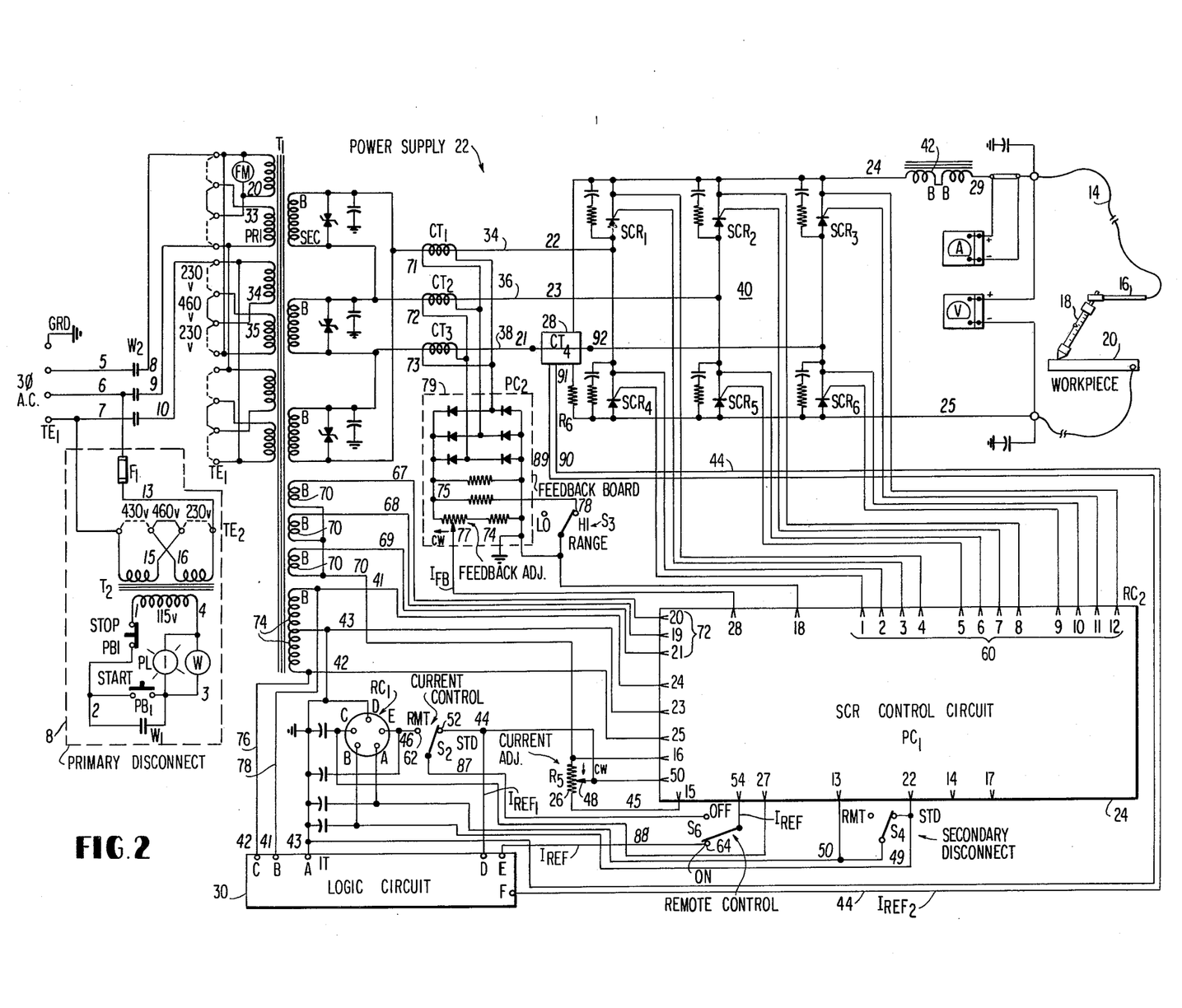
FIG. 2 is a combined block and schematic circuit diagram showing in more detail the operation of the invention and its interconnection with an existing welding machine.

FIG. 2 is a combined schematic and block diagram illustrating the present invention as applied to a conventional arc welding machine. Relatively high voltage three-phase A.C. power is applied to the input of the welding transformer $T_1$ whose relatively low voltage high current output is applied through three-phase conductors 34, 36 and 38, a six-SCR controllable bridge circuit 40 and a smoothing inductor 42 to the electrode holder 16.

A conventional primary disconnect or stop/start circuit 8 connects the welding machine to a suitable source of three-phase power. Briefly, the normally open start switch is momentarily closed to energize relay coil W which closes the three relay contacts $W_2$ in the three-phase power lines to energize the welding transformer $T_1$. A holding circuit, including contacts $W_1$ and the normally closed stop switch, keeps the line contacts $W_2$ closed until the primary disconnect circuit is interrupted by momentarily opening the stop switch to interrupt the holding circuit for coil W, thereby opening the line contacts $W_2$.

When rheostat 18 is connected as illustrated, the output current sensor 28, in the form of a current transformer $CT_4$ coupled to the transformer output conductor 38, produces on conductor 44 a voltage signal $I_{REF2}$ proportional to the calibrating current flowing through the conductor 38. (The current transformer is designed substantially to saturate at the higher current levels which exist during welding.) This voltage signal is applied to the terminal F of the logic circuit 30. The machine's main rheostat 26 is in the form of the potentiometer $R_5$ whose movable wiper arm 48 is electrically connected to the following three points: terminal 50 of control circuit 24, contact 52 of switch $S_2$ and terminal D of the logic circuit 30.

When the welding machine is operating in its standard mode—i.e., not in the remote control mode—switch $S_2$ is closed to contact 52 and remote control switch $S_6$ is closed to its OFF contact. Therefore, the welding current control voltage $I_{REF1}$ from the wiper arm 48 of the machine's main rheostat control is fed via contact 52 of switch $S_2$ and the OFF contact of switch $S_6$ directly to the input terminal 54 of the control circuit 24. (The RMT contact 62 and the plug receptacle $RC_1$ are used only for a conventional remote control wherein an extra remote control cable is plugged into the receptacle $RC_1$. This receptacle and associated circuits are shown only because they are part of the existing welding machine which is illustrated in FIG. 2.) This control voltage is adjustable within the approximate range of 0 to $-5.5$ volts. The output terminals 60 of control circuit 24 then apply appropriately-timed firing pulses to the gates of the six (6) SCRs, $SCR_1, \ldots SCR_6$, of the controllable power supply 22 for controlling the welding current supplied to the electrode holder 16.

Secondary disconnect switch $S_4$ is not part of the present invention and merely gives the operator a secondary disconnect or on/off control of the welding current. That is, when switch $S_4$ is closed to its STD contact, the open circuit voltage is applied across the output welding circuit, but the operator can remove this voltage by closing the switch to its RMT terminal. However, switch $S_4$ must be closed to its STD contact for operation of the wireless remote control system of this invention because, obviously, power must be flowing through the welding circuit in order for the current transformer $CT_4$ to generate a signal during the recalibrate cycle when the operator's remote rheostat 18 is used.

However, to enter the wireless remote control mode of this invention, switch $S_6$ is closed to its ON contact 64. Thus, the voltage $I_{REF1}$ representing the setting of the main machine rheostat 26 is fed to the input terminal D of the logic circuit 30 where it is processed with the desired welding current reference signal $I_{REF2}$ applied to terminal F of logic circuit 30 from the current transformer $CT_4$. The resulting control signal $I_{REF}$ is taken from terminal E of logic circuit 30 and passed through the ON contact 64 of switch $S_6$ to the same input terminal 54 of SCR control circuit 24. This control signal also varies in the range of 0 to $-5.5$ volts, depending upon the magnitude of welding current called for by the setting of the operator's remote rheostat 18. This control signal is also processed in the control circuit 24 which generates properly-timed gate signals for the SCRs in the power supply 22 to supply to the welding torch 16 a welding current equal to the value corresponding to the setting of the remote control rheostat 18.

In other words, the logic circuit 30 processes the pre-set welding current reference, the previously stored remote current reference, and the desired welding current reference called for by the operator's remote rheostat 18 and then delivers to control circuit 24 a control voltage $I_{REF}$ which is processed to produce gating signals which control firing of $SCR_{1-6}$ relative to the three-phase input voltage to produce the magnitude of welding current called for by the operator's rheostat 18.

Three secondary windings 70 wound on the core of the welding transformer 71 provide synchronizing waveforms to act as a reference for the control circuit 24 and apply approximately 30 VAC to the three terminals 72 of the control circuit. Similarly, the secondary windings 74 form the power supply for both the logic circuit 30 and control circuit 24 by applying 18 VAC via the conductors 76 and 78 to the input terminals C and B of the logic circuit; terminal A is grounded.

Current transformers $CT_1$, $CT_2$ and $CT_3$ sense the current flowing in the lines 34, 36 and 38 during welding. They feed signals indicative of the line currents to a feedback board 79 which merely provides at the input terminal 28 of the SCR control circuit 24 a feedback signal $I_{FB}$ proportional to the welding current for normal or conventional welding current control. That is, this feedback signal $I_{FB}$ is used to compare the actual welding current with the current called for by the control signal $I_{REF}$ appearing at the input terminal 54 of circuit 24, regardless of the source of the signal $I_{REF}$—i.e., regardless of whether the signal $I_{REF}$ is derived from the main machine rheostat 26 (i.e., $I_{REF1}$) or from the operator's remote wireless rheostat 18 (i.e., $I_{REF2}$). These current transformers and feedback board 79 are conventional.

Figures 3, 3A:
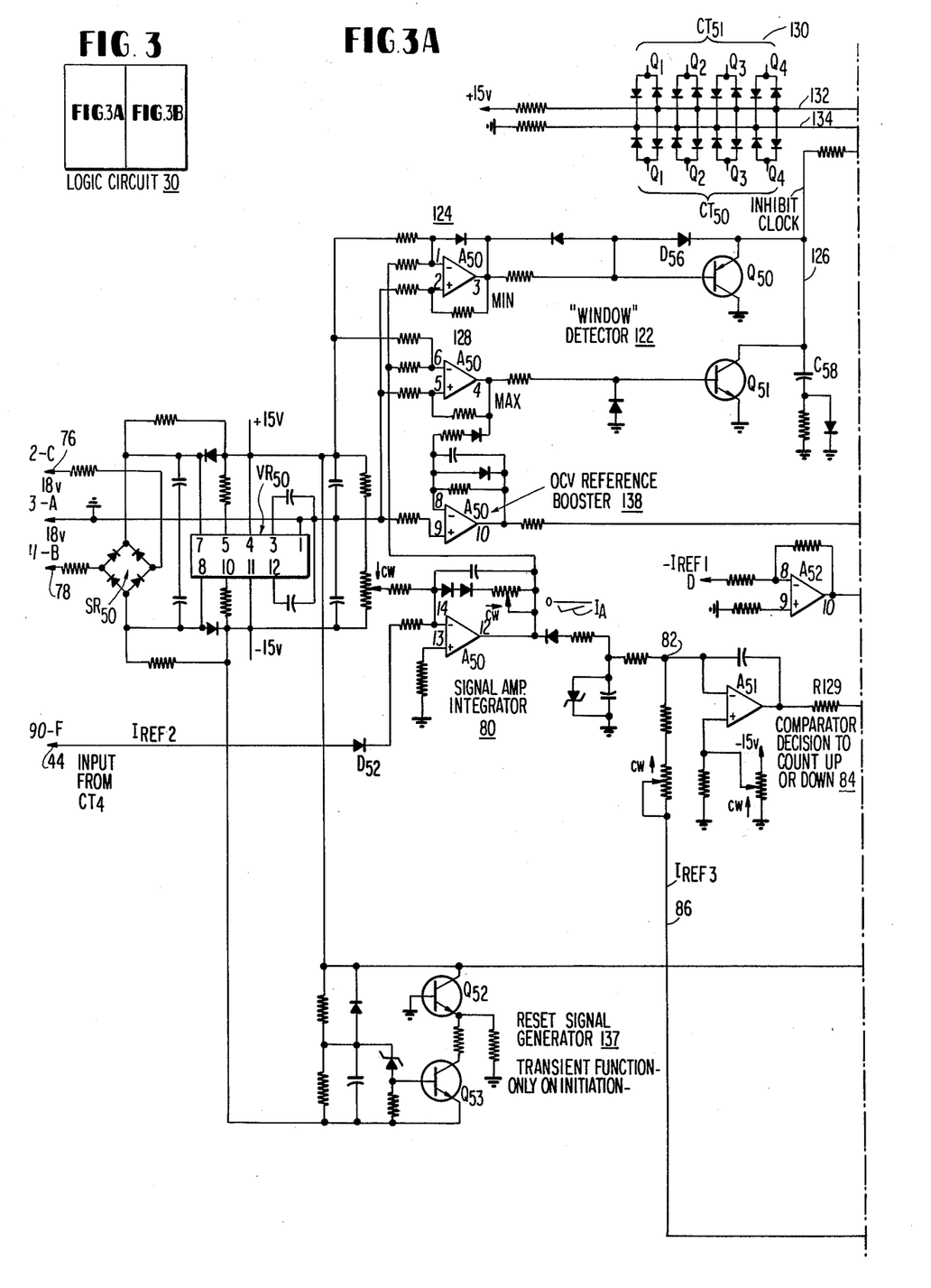

FIG. 3 is a schematic diagram of the logic circuit 30 illustrated as a block in FIGS. 1 and 2.

Figure 3B:
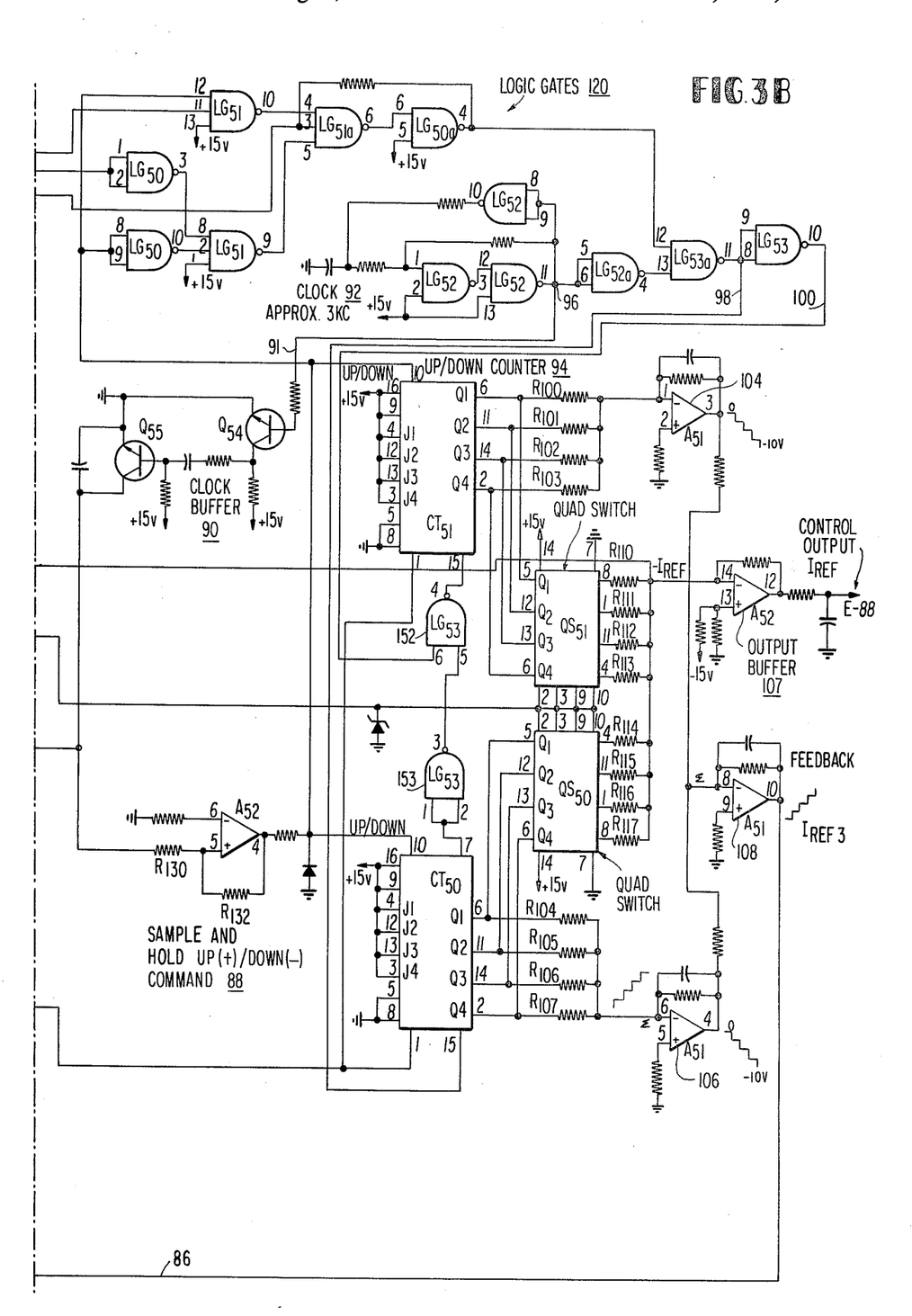

Before a detailed description of the logic circuit 30 is presented, a more generalized description of its operation and functions will be described.

When remote control switch $S_6$ in FIG. 2 is set for the remote control mode, one end of the operator's remote rheostat 18 is inserted in the electrode holder 16, and the other end is placed into electrical contact with the workpiece 20. The operator's rheostat 18 has a minimum resistance of a sufficiently high value such that an arc cannot be struck during the remote current setting or recalibrating mode. The current sensor 28, when it is in the form of the current transformer $CT_4$, produces a remote reference signal $I_{REF2}$ in the form of a voltage pulse whose width is proportional to the current flowing through the operator's rheostat 18—i.e., proportional to the desired welding current. This remote reference signal is amplified and integrated in logic circuit 30 to produce a negative voltage signal $I_4$ whose amplitude is proportional to the current flowing through the remote rheostat 18, and therefore is proportional to the percent setting of the rheostat. This signal $I_4$ is compared with the signal voltage $I_{REF3}$ proportional to the present count in the up/down counter—i.e., proportional to the previous welding current reference to determine whether the rheostat's remote reference signal $I_{REF2}$ is calling for more or less welding current reference than the previous value $I_{REF3}$ to produce an error signal which controls the application of clock pulses to a bidirectional or up/down counter 94 which is driven either up or down, depending upon the direction of the difference between the previous welding current reference and the welding current reference called for by the setting on the remote rheostat 18. The bidirectional counter is a binary counter whose output is used to gate bilateral switches which are fed with a voltage proportional to the main rheostat setting $I_{REF1}$. The resultant analog signal passed by the switches is thus proportional to the operator's percent setting times the main rheostat setting. This analog control signal $I_{REF}$ is then applied to the terminal 54 of the control circuit 24 which in turn controls the firing of the SCRs in the SCR bridge 40 to produce the desired welding current when the rheostat 18 is removed from the welding torch.

Logic circuit 30 also has a built-in delay of 2-5 seconds which means that the rheostat 18 must be in position for that period of time before a valid remote control signal is recognized, thereby preventing false operation because of transient currents which may exist in the system. Furthermore, there is provided a window detector circuit which blocks the clock pulses from the counter circuits if the remote signal corresponds to a detected current below a predetermined minimum value or above a predetermined maximum value.

The bidirectional binary counter 94 stores the value of the welding current reference which is set for each remote recalibration operation. Therefore, for a subsequent remote recalibration operation, the counter is merely driven in the proper direction the required number of counts until it reaches the count corresponding to the new desired welding current level.

Let us now look at FIG. 3 in more detail. Again, with remote control switch $S_6$ closed to its ON contact 64 and with the operator's remote rheostat 18 connected in series with the welding circuit as shown in FIG. 2, the current transformer $CT_4$ senses the current flowing through the rheostat and produces on line 44 voltage pulses $I_{REF2}$ whose widths are proportional to the sensed current. This voltage signal is applied to the terminal F of the logic circuit 30, rectified by diode $D_{52}$, and fed to the inverting input of an amplifier/integrator circuit 80 whose output $I_4$ is a negative voltage proportional to the width of the current transformer pulses and therefore proportional to the current flowing through the operator's remote rheostat 18.

The output of the amplifier/integrator 80 is summed at the inverting input 82 of a comparator 84 with a staircase feedback signal $I_{REF3}$ appearing on line 86. This feedback signal $I_{REF3}$ is proportional to the stored value of the previously set welding current reference. The output of the comparator 84 is determinative of whether the previously stored value of welding current reference must be increased or decreased in order to reach the level called for by the setting on the operator's remote rheostat 18. A positive output level of about $+15$ volts calls for an increase, and a negative output level of about $-15$ volts calls for a decrease. The output of comparator 84 is fed to the non-inverting input of a sample and hold circuit 88 which produces a counter command signal: positive (+) for an increase in welding current reference or driving the counter 94 up, and a negative (−) command signal for a decrease in welding current reference or driving the counter down. This command signal is applied to the up/down control terminals 10 of the two four-stage binary counters $CT_{50}$ and $CT_{51}$ included in the up/down counter 94. A 3 KHz clock generator 92 is continuously running and, under certain conditions to be explained below, produces on line 98 a train of positive clock pulses which are applied to count input terminal 15 of counter $CT_{50}$.

Let us now look at the basic operation of the up/down counter 94. First, the circuit comprising integrator 80, comparator 84, sample-and-hold circuit 88 and counters $CT_{50}$ and $CT_{51}$ functions as an analog-to-digital circuit for converting the current transformer $CT_4$ remote control output signal $I_{REF2}$ to a binary number. A positive output from the sample-and-hold circuit 88 on the up/down inputs 10 of the two counters $CT_{50}$ and $CT_{51}$ causes the counters to count "up" in response to the clock pulses applied to terminal 15 of counter $CT_{50}$. These counters are four-stage binary counters. Therefore, counter $CT_{50}$ has a maximum count of 15 (0-15). When it is full, the next (16th) clock pulse produces on terminal 7 a carry-out pulse which is passed through the two NAND gates 150 and 152 to the count input terminal 15 of counter $CT_{51}$. In other words, every 16th clock pulse at the count input of counter $CT_{50}$ steps counter $CT_{51}$ by one count.

The resistive ladder networks $R_{100-103}$ and $R_{104-107}$ connected to the four output stages of counters $CT_{50}$ and $CT_{51}$, respectively, convert the binary counts of the counters to positive analog staircase currents. In each of these resistive networks, the resistor connected to the output of the $Q_1$ counter stage is the least significant and has the highest resistive value. Furthermore, $Q_1$'s resistor has twice the resistance of $Q_2$'s resistor, $Q_2$'s resistor has twice the resistance of $Q_3$'s resistor, etc. This is a well-known network. The two amplifiers 104 and 106 convert the positive staircase currents to negative staircase voltages varying from 0 to −10 volts. The output feedback amplifier 108 then combines them into the positive staircase voltage signal $I_{REF3}$ which is fed back via the line 86 to the summing junction 82 of the comparator 84. In other words, the feedback signal $I_{REF3}$ is an analog voltage representing the present count in the binary counters, and this present count is compared with the incoming control signal $I_{REF2}$ ($I_4$) from transformer $CT_4$ to determine whether the counters must be driven up or down to meet the welding current reference requirement designated by the setting of the operator's rheostat 18. The counters $CT_{50}$ and $CT_{51}$ may be RCA model CD-4029.

The 18 VAC power supply applied to the terminals A, B and C of logic circuit 30 is rectified by diode bridge rectifier $SR_{50}$ and then fed through a voltage regulator $VR_{50}$ which supplies the +15 VDC and −15 VDC bias voltages for the logic circuit 30. The voltage regulator $VR_{50}$ is a dual polarity tracking regulator Motorola model MC-1568/MC-1468.

Figure 9:
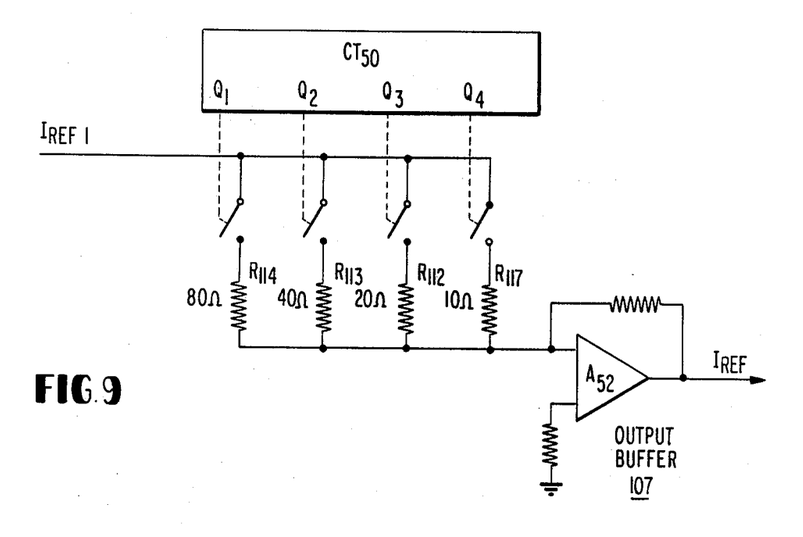
FIG. 9 is a schematic diagram of the equivalent circuit of one of the quad switches shown in FIG. 3.

The signals representing the percentage setting on the operator's rheostat 18 have been discussed above. Correlating the percentage position signal to an actual welding control signal is accomplished by the quad switches $QS_{50}$ and $QS_{51}$, which may be RCA model 4066 COS/MOS Bilateral Switches. As an example, an equivalent circuit of switch $QS_{50}$ is shown in FIG. 9. Basically, there are four parallel switches connected to the counter terminals $Q_1-Q_4$ of counter $CT_{50}$, with a count of "1" (+15 volts) on a switch closing that switch. Each switch is connected in series with one resistor of a ladder or summing resistor network similar to the ones discussed previously—i.e., the highest value resistor is connected in series with the $Q_1$ switch, and each resistor has twice the resistance of the next higher numbered resistor. Connected across the four parallel switches is the inverted and amplified voltage signal $I_{REF1}$ (0 to +15 volts), which is the signal corresponding to the setting at the main rheostat in the machine and derived from terminal D of logic circuit 30.

The Q switches and their associated resistors $R_{110-113}$ and $R_{114-117}$ form another digital-to-analog circuit which produces at the output buffer 107 the control voltage $I_{REF}$ which appears at terminal E of logic circuit 30 and terminal 54 of the SCR control circuit 24. This voltage is in the range of approximately 0 to −5.5 volts. Again, this voltage is indicative of the actual weld current reference desired by the operator and will be compared during welding with the arc current feedback signal $I_{FB}$. A current regulator will then control the firing of the $SCR_{1-6}$ to obtain the correct arc welding current. The switches and ladder network associated with the switches function generally as follows.

The $I_{REF}$ voltage of 0 to −5.5 volts applied to the SCR control circuit 24 may represent, say, maximum welding current (−5.5 volts). As one example, if the main rheostat 26 is set for maximum welding current and the wiper setting on the remote rheostat 18 is set at 100%, then all of the Q switches would be closed and the control voltage would be at the maximum level.

As another example, assume the main rheostat 26 is set at half the rated welding current, and again the remote rheostat is set at 100%, then the control voltage will be −2.5 volts. However, if the main rheostat 26 were set at maximum rated current, and the remote rheostat 18 were set at 50%, then, again, the control voltage would be −2.5 volts. Therefore, the function of the quad switches $QS_{50}$ and $QS_{51}$ and their output resistors is to provide an analog voltage which will be used as the arc current reference signal, and this in turn will be compared with arc current feedback signal $I_{FB}$. The difference between arc current reference $I_{REF}$ and arc current feedback $I_{FB}$ is amplified and used to control the firing angle of the SCRs. The operator's rheostat is merely set at a percentage of the welding current reference already pre-set by the main control 26 in the machine.

A series of logic NAND gates 120 are provided for blocking the clock pulses from the up/down counter 94 under certain conditions. More specifically, the counter is not to be driven unless the current flowing through the operator's remote rheostat 18 is between predetermined minimum and maximum values. Furthermore, if the counters are storing their maximum value—i.e., all ones—and the operator's rheostat calls for an increase in current, the counters cannot be driven, as they would reset to all zeroes. Similarly, if the counters are already storing their minimum value—i.e., all zeroes—and the operator's rheostat calls for a decrease in the welding current, again the counters cannot be driven by the clock pulses, as they would assume the maximum value—i.e., all ones.

Therefore, a window detector circuit 122 is provided for the purpose of blocking the clock pulses from the counter when the output current flowing through the welding cable is below a predetermined minimum value (e.g., 40 ma) or above a maximum predetermined value (e.g., 200 ma). The operator's rheostat 18 has a minimum resistance which limits the maximum current flowing therethrough to 200 ma which is insufficient to strike an arc. A minimum threshold circuit 124 produces on line 126 a "clock inhibit" signal when the sensed current is below the predetermined minimum value, and a maximum threshold circuit 128 applies to line 126 a "clock inhibit" signal when the sensed current exceeds the predetermined maximum value. Line 126 is connected to the logic gates 120 which function to block the clock generator pulses from lines 98 and 100 unless the sensed current is between these predetermined minimum and maximum values. Similarly, the diode network 130 connected in parallel with the $Q_1-Q_4$ outputs of the counters $CT_{50}$ and $CT_{51}$ generate appropriate clock inhibit signals on lines 132 and 134 to inhibit counting down when the counters are storing all zeroes, and to inhibit counting up when the counters are storing all ones. These inhibit signals are also applied to the logic gates 120 to block the clock generator pulses from the lines 98 and 100.

More particularly, the negative voltage signal $I_4$ from the integrator 80 is applied to the window detector 122 which operates as previously described to provide on conductor 126 a "clock inhibit" logic state when the current sensed by transformer $CT_4$ is either less than 40 ma or more than 200 ma (it is assumed that no arc will be struck with a current of 200 ma or less). This logic state causes the logic gates 120 to block the clock pulses of clock generator 92 from line 98, and thus, from the count input 15 of binary counter $CT_{50}$.

The capacitor $C_{58}$ in conjunction with the resistor $R_{61}$ provides the RC time constant which produces the 2–5-second delay which prevents false recalibration due to transients.

In more detail, when the current flowing through rheostat 18 (and transformer $CT_4$) is below 40 ma, transistor $Q_{50}$ is conducting, thereby shunting the output of amplifier 124 to ground or zero volts and preventing capacitor $C_{58}$ from charging positively; thus, line 126 is also at ground, the "clock inhibit" condition. However, when the current exceeds 40 ma, transistor $Q_{50}$ becomes non-conducting so that the output of the MIN amplifier 124 flows through resistor $R_{61}$, diode $D_{56}$ and capacitor $C_{58}$ to start charging capacitor $C_{58}$ towards +15 volts. At some level below +15 volts, the "clock inhibit" signal will be removed to permit the logic gates 120 to pass the clock signals to the counter circuits. Resistor $R_{61}$ and capacitor $C_{58}$ form an RC time constant circuit which provides a 2–5-second delay before the "clock inhibit" signal is removed, thereby avoiding any false detection of a recalibration cycle due to transient currents.

When the current is below 200 ma, the transistor $Q_{51}$ is off and has no effect on capacitor $C_{58}$ or the voltage level appearing on line 126. However, when the current exceeds 200 ma, transistor $Q_{51}$ conducts to start discharging capacitor $C_{58}$ to ground, thereby eventually lowering the voltage on line 126 from amplifier 128 to the "clock inhibit" level of approximately ground or zero volts, thereby again blocking the clock signals from the counter circuits. Each of the NAND gates $LG_{50}$, $LG_{51}$ and $LG_{52}$ in logic gates 120 operates such that its output goes down or to ground only when all of its inputs are up or positive. Conversely, if any one of the NAND gates' inputs is down, then the output of the gate is up. For example, if the window detector is detecting a current within the "window" of 40 ma to 200 ma, the voltage on capacitor $C_{58}$ eventually reaches a positive level, whereby terminal 3 of NAND gate $LG_{51a}$ is up. If the counters are neither all zeroes nor all ones, then input terminals 4 and 5 of NAND gate $LG_{51a}$ will also be up, and the output of NAND gate $LG_{51a}$ at terminal 6 is down. Consequently, the output terminal 4 of NAND gate $LG_{50a}$ is up as is the input terminal 13 of NAND gate $LG_{53a}$. The clock signal appearing at point 96 is inverted by NAND gate $LG_{52a}$ and applied to the other input terminal 12 of NAND gate $LG_{53a}$, thereby producing on line 98 the clock signal which is fed to count input 15 of counter $CT_{50}$.

Conversely, when the rheostat current is outside of the window of 40 ma to 200 ma, the "clock inhibit" or down condition of line 126 will cause the output terminal 6 of NAND gate $LG_{51a}$ to be up and the output terminal 4 of NAND gate $LG_{50a}$ to be down, thereby blocking the clock pulses from the output of NAND gate $LG_{53a}$ since this output stays up and will not follow the clock signal appearing on terminal 13 of NAND gate $LG_{53a}$.

The reset signal generator 137 functions only during start-up of the welding machine. As previously explained, the counters are of the jammable type. A jammable counter is designed to return to a predetermined condition at start-up, in this case, to all ones, so that every time the machine is started up, the counters are set at all ones corresponding to a 100% setting on the operator's rheostat. The reset or jam pulse applied by generator 140 to terminals 1 of the counters $CT_{50}$ and $CT_{51}$ accomplishes this all-one jamming or resetting in conjunction with the counters' $J_1$–$J_4$ terminals which are all tied to +15 volts.

The OCV reference booster 138 is an open circuit voltage reference booster and assures an open circuit voltage of approximately 67 volts during actual open circuit conditions or during the recalibrate cycle. This produces an additional voltage signal on the output buffer 107, and, therefore, in the control output signal $I_{REF}$, but this additional voltage does not introduce any error because it is in effect cancelled out in the SCR control circuit 24.

Clock buffer 90 and sample-and-hold circuit 88 are required only because of a peculiarity of the counters $CT_{50}$ and $CT_{51}$—i.e., the up/down mode signal on terminals 10 of the counters can be changed only upon the occurrence of a positive clock pulse at the clock or count input terminals 15 of the counters. Therefore, the leading edge of each clock on conductor 91 triggers the single-shot clock buffer 90 which has a time constant of 100 μs. Clock buffer 90 may be considered functionally as a toggle switch connecting the output of the amplifier $A_{51}$ of comparator 84 to ground. At the beginning of each positive clock pulse, this switch opens—i.e., transistor $Q_{55}$ becomes non-conducting to permit the +15 volts or −15 volts output of comparator 84 to be applied to the non-inverting terminal 5 of the amplifier $A_{52}$ of sample-and-hold circuit 88, thereby assuring that the up or down signal appears on the output of circuit 88 (and, consequently, on the input of up/down counter input terminals 10) on a positive clock applied to the clock terminals 15. The positive feedback resistor $R_{132}$ forms a hold or latching circuit which latches up the output of circuit 88 to the +15 volts or −15 volts up/down signal appearing on its input terminal 5. After the 100 ms interval, the clock buffer switch 90 closes—i.e., transistor $Q_{55}$ returns to its conducting state which returns the junction of resistors $R_{129}$ and $R_{130}$ to ground.

Figures 4, 4B:
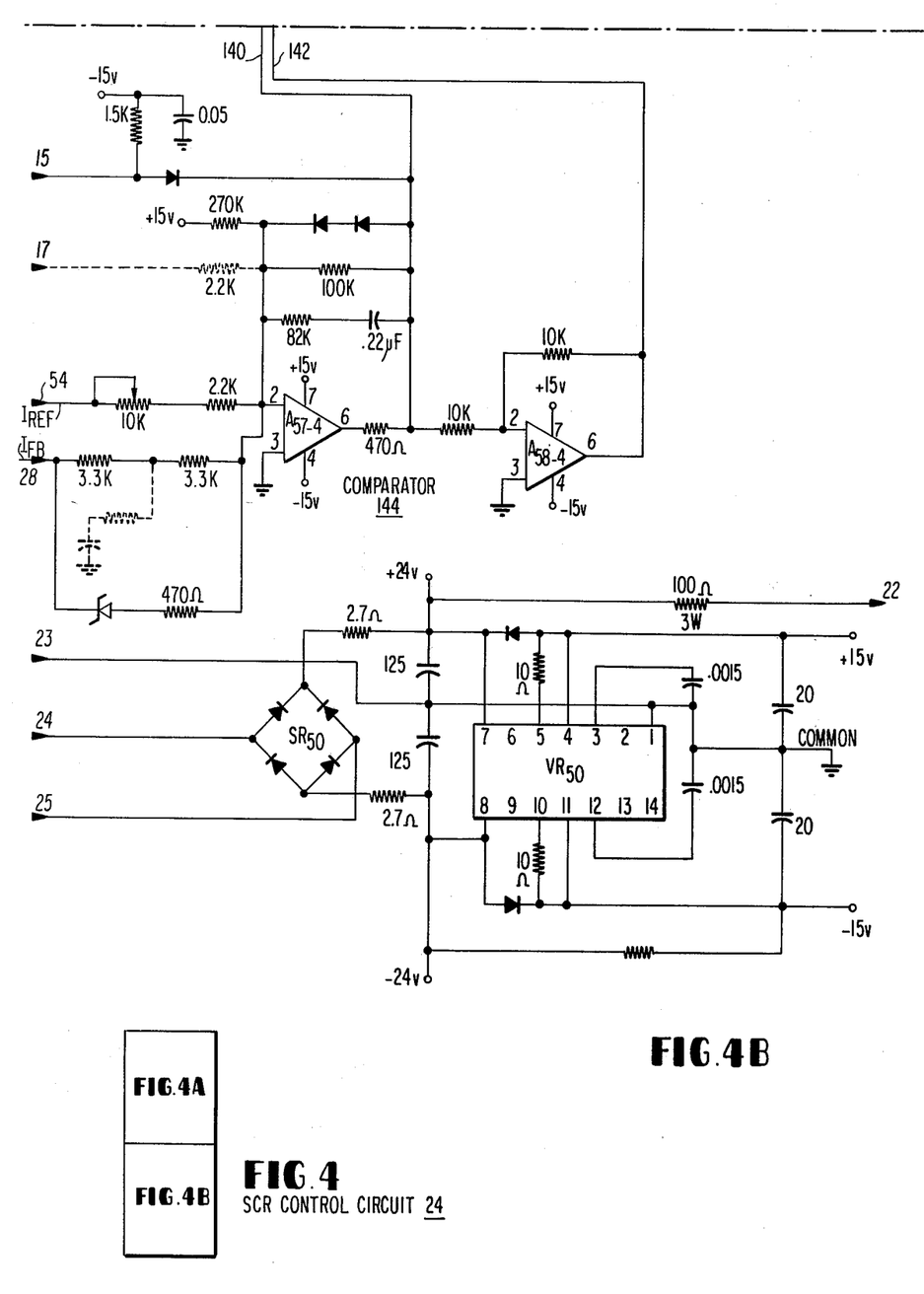
Figure 4A:
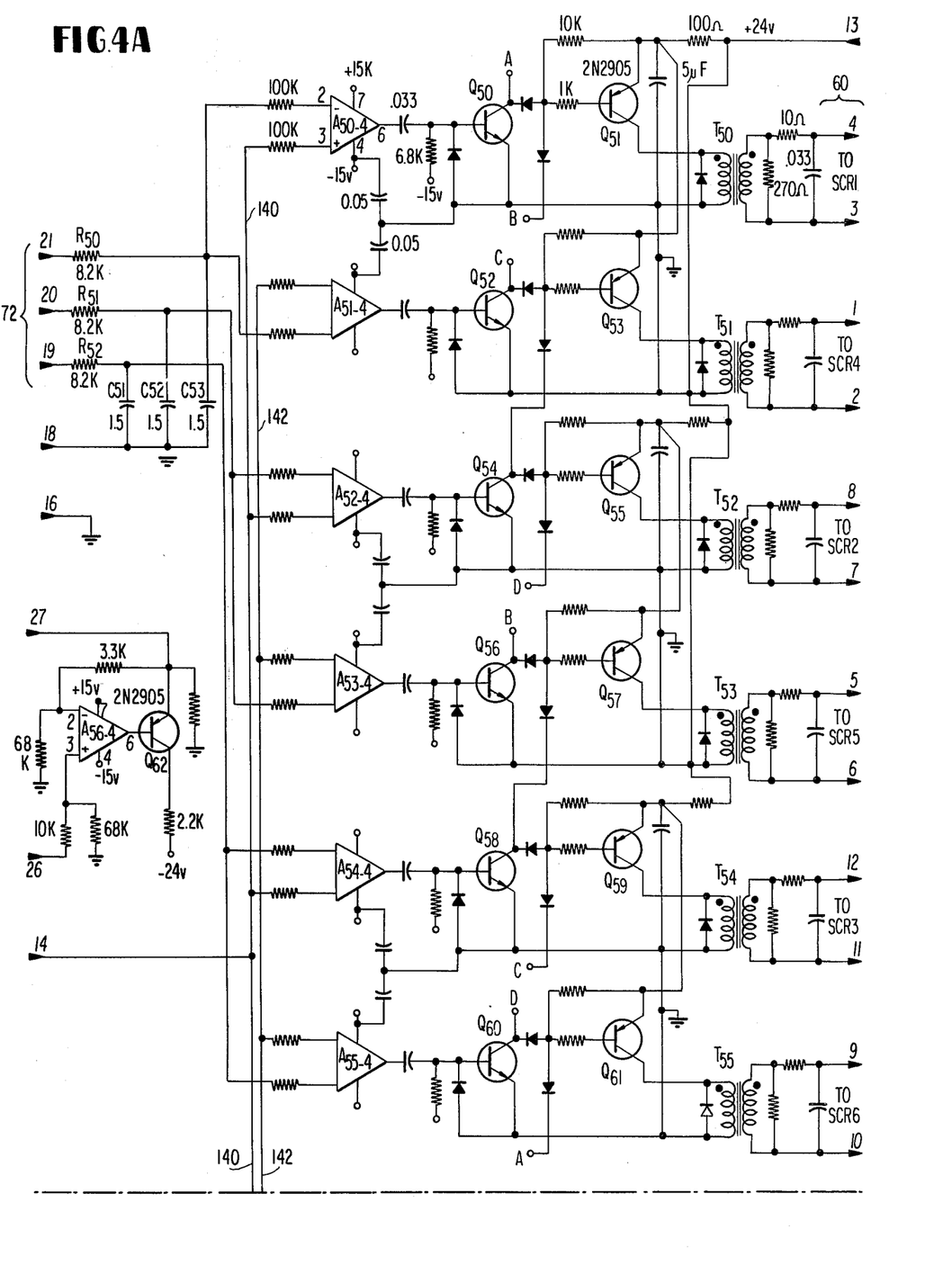

FIG. 4 is a schematic circuit diagram of one form of SCR control circuit 24 for controlling the firing of the six SCRs in the bridge 40 of the power supply 22. The corresponding terminals in FIGS. 2 and 4 carry the same reference numerals.

Briefly, an A.C. reference or rider signal, derived from the welding transformer $T_1$, is applied to the input of a comparator $A_{50-4}$ and compared to a D.C. level which is called current error, or Esig. This signal is the result of comparing the $I_{REF}$ signal with the signal $I_{FB}$ proportional to the actual arc signal and amplifying the difference in a current regulator. When the rider signal exceeds this D.C. level, the comparator $A_{50-4}$ changes state, and a pulse is generated, shaped, amplified and then applied to the gates of the corresponding ones of the thyristors $SCR_{1-6}$ to produce a welding output voltage which is proportional to the D.C. level and which will produce the welding current according to the setting of the operator's remote control rheostat 18 in the previous recalibration operation.

The SCR control circuit 24 contains three pairs of comparators $A_{50-4}$, $A_{51-4}$; $A_{52-4}$, $A_{53-4}$; $A_{54-4}$, $A_{55-4}$, each pair of which controls the corresponding pair of thyristors $SCR_1$, $SCR_4$; $SCR_2$, $SCR_5$; or $SCR_3$, $SCR_6$. Since the description of each pair of comparators and its associated circuits is the same, the following description will be applied only to the comparator pair $A_{50\text{-}4}$, $A_{51\text{-}4}$ which controls the firing of the thyristor pair $SCR_1$, $SCR_4$.

More specifically, the A.C. reference or rider voltage is derived from the secondary winding 70 on the welding transformer $T_1$ and applied to the three terminals 72 of the control circuit 24 and to circuit common. Of course, these rider signals are in synchronism with the line-to-line voltages applied across the thyristor bridge 40. These rider or reference signals are then phase-shifted 60° by the resistor-capacitor combination of $R_{50}$ and $C_{53}$, $R_{51}$ and $C_{52}$, and $R_{52}$ and $C_{51}$. The 60° phase shift provides two functions: the first function is to integrate out any noise or line-notching that may appear in the rider voltage; and the second function is to phase-shift the rider to the desired position with respect to the line-to-line voltage. By using line-to-line voltages, the complete system is insensitive to phase rotation. The phase-shifted rider is then applied to the inverting input (−) of comparator $A_{50\text{-}4}$ and to the non-inverting input (+) of comparator $A_{51\text{-}4}$. The rider is then compared to a D.C. signal which is a negative D.C. voltage applied to the non-inverting input (+) of comparator $A_{50\text{-}4}$ and a positive D.C. voltage applied to the inverting input (−) of comparator $A_{51\text{-}4}$ via the conductors 140 and 142, respectively. These D.C. voltages are produced at the outputs of the current regulating amplifier $A_{57\text{-}4}$ and the inverting amplifier $A_{58\text{-}4}$, respectively.

Assuming that the negative D.C. voltage applied to the non-inverting input of comparator $A_{50\text{-}4}$ is of lesser amplitude than the peak voltage of the rider, then the output of comparator $A_{50\text{-}4}$ is set at −15 volts during a period consisting of the entire positive half of each cycle of the rider voltage and to the point of the first part of the negative half-cycle required for the rider to exceed the D.C. level on the non-inverting input of the comparator $A_{50\text{-}4}$. At this point in the negative half-cycle, comparator $A_{50\text{-}4}$ changes state and its output is set at +15 volts. During the transition of the output of comparator $A_{50\text{-}4}$ from −15 volts to +15 volts, the output signal is coupled through capacitor $C_{54}$ as a positive pulse and applied to the base of transistor $Q_{50}$ which turns on, thereby lowering the bias on the base of transistor $Q_{51}$ which then also turns on. Consequently, current flows through transistor $Q_{51}$ and the primary of the pulse transformer $T_{50}$ whose secondary is connected between the gate and cathode of thyristor $SCR_1$ via the individual terminals 3 and 4 of the set of output terminals 60 of the SCR control circuit 24, thereby turning on $SCR_1$.

The capacitor $C_{54}$ and resistor $R_{55}$ connected to the output of comparator $A_{50\text{-}4}$ form a differentiating circuit which generates a finite pulse width to minimize the power dissipation in the driver transistor $Q_{51}$.

Transistor $Q_{50}$, in addition to driving transistor $Q_{51}$, also drives, via a terminal A, transistor $Q_{61}$ in another channel, thereby simultaneously firing thyristor $SCR_6$ to provide a return path for the welding current. Furthermore, the transistor $Q_{51}$ is also turned on by another channel 60° lagging or leading, depending on phase rotation of the three-phase input power. Each of the comparators $A_{50\text{-}4}$–$A_{55\text{-}4}$ and its associated circuitry leading to a pulse transformer and an SCR may be considered to be a channel. For example, the output of transistor $Q_{56}$ in the $SCR_5$ channel also drives transistor $Q_{51}$ in the $SCR_1$ channel via the common terminal B. A detailed description of the firing sequence of a six-thyristor bridge is not required; suffice it to say that each thyristor must be fired two times every cycle when single pulse firing is used. This is the reason for using the cross-coupling diodes, such as diodes $D_{51}$ and $D_{52}$.

The operation of the channel containing comparator $A_{51\text{-}4}$ is the same as that of the comparator $A_{50\text{-}4}$ channel, except that comparator $A_{51\text{-}4}$ operates on the positive half-cycle of the rider signal, and, for this reason, opposite inputs of comparator $A_{51\text{-}4}$ are used for the rider and D.C. level signals; i.e., a positive D.C. voltage from the output of inverter $A_{58}$ is applied via line 142 to the inverting input (−) of comparator $A_{51\text{-}4}$, while the rider signal is applied to the non-inverting input (+). Thus, with a positive voltage on the inverted input of comparator $A_{51\text{-}4}$, the comparator output is set at −15 volts during the negative half-cycle of the rider, etc.

The schematic diagram of FIG. 4 shows that the remaining four channels, containing the comparators $A_{52\text{-}4}$, $A_{53\text{-}4}$, $A_{54\text{-}4}$ and $A_{55\text{-}4}$, respectively, operate exactly the same as the $A_{50\text{-}4}$ and $A_{51\text{-}4}$ channels, except that each pair of the remaining four channels is synchronized with a different phase rider signal.

The two signal inputs to the SCR control circuit 24 are the remote control signal $I_{REF}$ at terminal 54 and the feedback signal $I_{FB}$ at terminal 28. These signals are applied to a comparator circuit 144 having an operational amplifier $A_{57\text{-}4}$ with a finite gain that sums the negative control signal $I_{REF}$ and the positive feedback signal $I_{FB}$, and amplifies the error or difference between these two signals. The output of the amplifier $A_{57\text{-}4}$ is the D.C. voltage level appearing on conductors 140 and 142 and which determines the firing angle of the thyristors $SCR_{1\text{-}6}$, thereby controlling the output welding current to the value called for by the setting of the operator's remote rheostat 18.

A voltage regulator circuit, including a voltage regulator $VR_{50\text{-}4}$ and associated circuitry similar to regulator $VR_{50}$ in FIG. 3, provides (via pin 22, switch 56 and pin 13) the +24 volts operating potential for the transistors in the SCR control circuit 24.

FIG. 5 is a perspective view of the operator's remote rheostat 18 and shows the exterior features thereof. The rheostat is cylindrical and generally in the form of a pencil. The rheostat contains a tubular body 200 containing calibration marks in units from 0–100 indicating percentages of the output welding current set by the main rheostat control 26. A clip 201 snaps around the body to enable the operator to clamp the rheostat to his shirt pocket. Protruding from one end of the rheostat is a solid cylindrical electrode 202 which is adapted to be clamped in the jaws of the welding torch 16. Protruding from the other end of the rheostat is a pointed electrode 204 which is adapted to form electrical contact with the workpiece 20. The rheostat is manually adjusted by movement of a cursor 206 which is internally connected to a wiper. The position of the wiper on the internal rheostat resistor is determined by observing the position of the cursor 206 relative to the percentage calibration marks. A lamp 208 is connected in parallel with the rheostat and is illuminated when current is flowing through the rheostat, thereby indicating to the operator that the rheostat is making electrical contact between the welding torch and the workpiece.

Figure 6:
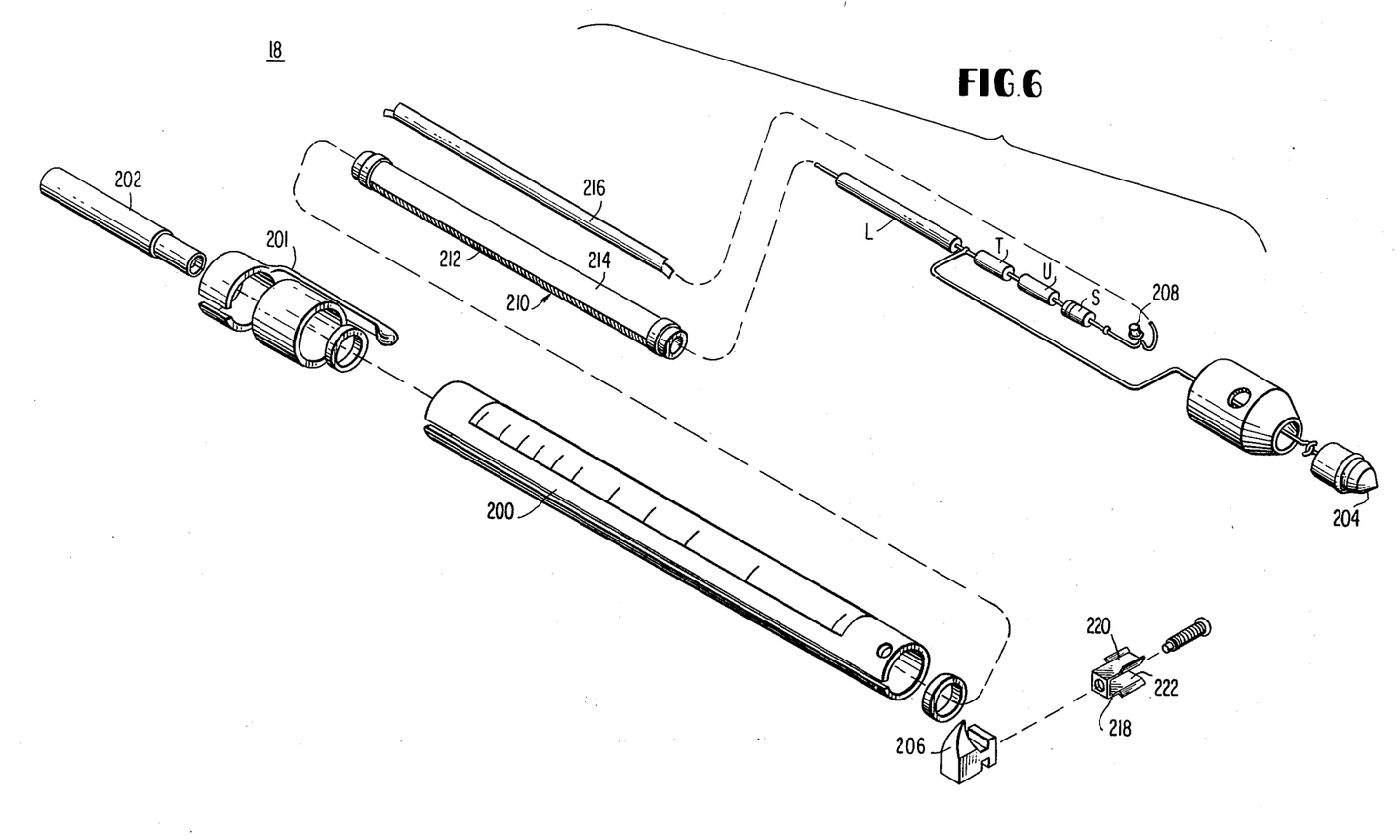
FIG. 6 is an exploded view of the rheostat illustrated in FIG. 5.

FIG. 6 is an exploded view of the operator's rheostat 18 and shows the manner in which it is constructed. The adjustable portion of the rheostat consists of a wound resistor 210 having an exposed longitudinal strip portion 212, with the remainder being covered with an insulating coating 214. Angularly spaced from the exposed strip portion is a conductive strip 216. The cursor 206 is fixed to a wiper 218 having arms 220 and 222 which are adapted to electrically engage and ride upon the conductor strip 216 and the exposed resistor winding strip portion 212.

A fixed resistor L is connected in series with the wound resistor 210 and has a value of 500 ohms, which is sufficient to limit the current flowing through the operator's rheostat to a value lower than that required to strike an arc. Resistors T and U, and diode S, are connected in series with the lamp 208.

Figure 7:
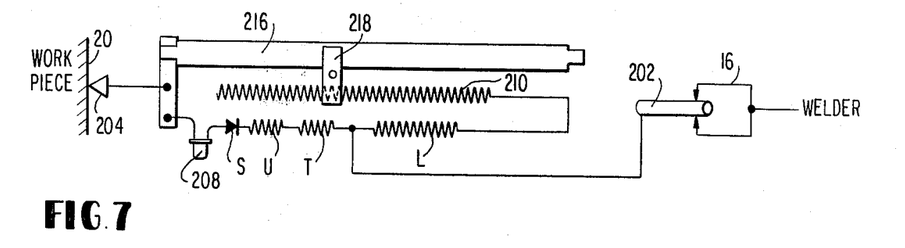
FIG. 7 is a schematic circuit diagram of the rheostat shown in FIGS. 5 and 6.

FIG. 7 is a schematic circuit diagram of the operator's rheostat 18 and carries reference numerals indicating components corresponding to those shown in the previous figures.

Figure 8:
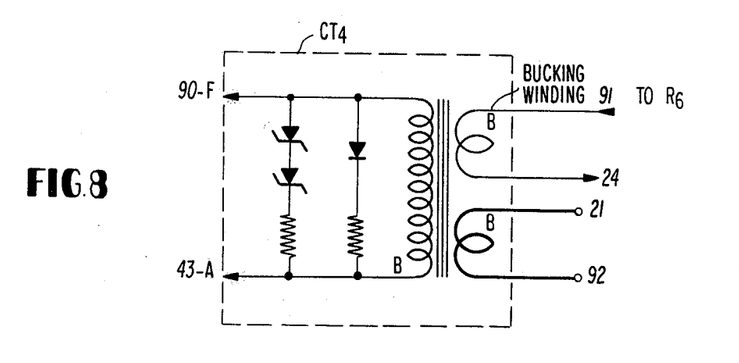
FIG. 8 is a schematic diagram of a preferred form of current transformer which may be used as a current sensor.

FIG. 8 is a schematic diagram of one form of control transformer $CT_4$ which may be used as the current sensor 28. Other forms of current sensor which could be used are Hall effect devices, thermistors, electro-optical devices, etc. One advantage of this current transformer is that the width of its output signal pulses is directly related to the setting of the wiper contacts on the operator's rheostat 18. Another advantage is that for the welding machine illustrated in FIG. 2, by the use of another bucking winding, the current which is inherently drawn by resistor $R_6$ (which has to be in the circuit for reasons not related to the remote control feature of this invention) is balanced out so that it does not mask the current drawn by the operator's rheostat 18.

I claim:

1. In an arc welding machine having a controllable power supply for controllably supplying welding current to a workpiece through a welding cable and electrode holder, said machine containing an internal manually adjustable welding current setting means coupled to said power supply for controlling a pre-set magnitude of the welding current in response to an internal control signal derived from the internal current setting means, the improvement comprising:
   remote welding current setting means for producing, via the welding cable, a calibrating current indicative of a desired magnitude of welding current; and
   comparison means at said machine and responsive to said internal control signal, and to a remote control signal derived from said calibrating current, for producing a modified remote control signal indicative of said desired magnitude of welding current; and
   wherein said remote welding current setting means comprises continuously adjustable remote resistor means of predetermined minimum resistance and adapted to be removably connected in series between the electrode holder and the workpiece, said minimum resistance being sufficiently high so as not to permit an arc to be struck when said resistor means is connected;
   said continuously adjustable resistor means producing an infinite number of calibrating current values corresponding to an infinite number of desired magnitudes of welding current.

2. The improvement of claim 1 further comprising calibrating current sensing means at said machine for producing said remote control signal as a signal proportional to the calibrating current flowing through said cable when said remote resistor means is connected, said remote resistor means comprising adjustable rheostat means which is manually settable to produce in said welding cable a calibrating current indicative of said desired magnitude of welding current so that said remote control signal produced by said current sensing means is indicative of the desired welding current.

3. The improvement defined in claim 2 further comprising switch means for selectively applying said internal and modified remote control signals to said controllable power supply for setting the welding current at said pre-set and desired magnitudes, respectively.

4. The improvement of claim 2 wherein said comparison means comprises bi-directional counter means responsive to signals derived from said internal and remote control signals for incrementally varying the modified remote control signal to cause said power supply repeatably to produce the desired welding current in accordance with the setting of said rheostat means.

5. The improvement defined in claim 4 further comprising:
   means responsive to a first said modified remote signal, corresponding to a first setting of said rheostat means, for stepping said counter means to a first count corresponding to a first said desired welding current while said remote resistor means is connected, whereby said first count is stored in said counter means when said remote resistor means is disconnected; and
   means responsive to a second said modified remote control signal, corresponding to a second setting of said rheostat means, for stepping said counter means to a second count corresponding to a second said desired welding current when said remote resistor means is reconnected, whereby said second count is stored in said counter means.

6. The improvement of claim 2 wherein said resistor means comprises a tubular housing having a conductive extension on one end thereof for engagement by the electrode holder and a conductive point contact on the other end thereof for engagement with the workpiece, an adjustable rheostat located in the housing and electrically connected between said conductive extension and said contact point, and external manual rheostat adjustment means mounted on said housing for varying the resistance of the rheostat.

7. The improvement as defined in claim 6 wherein said housing contains external calibrations associated with the position of said manually adjustable rheostat means for indicating the desired welding current magnitude as a percentage of the pre-set welding current magnitude.

8. The improvement of claim 6 wherein said conductive extension is electrically connected to said electrode holder, and said conductive point contact is electrically connected to said workpiece.

9. The improvement of claim 2 wherein said current sensing means comprises a current transformer having an input winding coupled to the calibrating current flowing through said welding cable and an output winding coupled to said comparison means, said transformer saturating at welding current levels.

10. The improvement defined in claim 1 further comprising means for supplying said modified remote control signal to said controllable power supply to produce a welding current equal to said desired magnitude of welding current.

11. The improvement defined in claim 10 further comprising feedback circuit means responsive to the welding current for controlling said controllable power supply to maintain said welding current at said desired magnitude.

12. In combination:

a pen-type manually adjustable rheostat; and an arc welding machine of the type having a controllable power supply for controllably suppying welding current to a workpiece through a welding cable and an electrode holder, said machine containing an internally manually-adjustable welding current setting means coupled to said power supply for controlling the pre-set magnitude of the welding current in response to an internal control signal derived from the internal current setting means; said rheostat comprising:

an insulating tubular housing of electrically non-conductive material;

elongated electrode means on one end of said housing for being electrically engaged by said electrode holder;

a point contact electrode means at the other end of said housing for electrically engaging said workpiece;

manually-adjustable resistor means mounted within said housing and electrically coupled between said elongated and point contact electrode means and having continuously movable wiper arm means whose position along the longitudinal axis of said housing determines the value of a calibrating current from which is derived a modified remote control signal to be applied to said power supply for modifying the pre-set magnitude of the welding current in accordance with the remote control signal to produce a desired welding current determined by said position of said wiper arm means, said resistor means having a minimum resistance sufficient to prevent the striking of an arc when said rheostat is simultaneously electrically engaged by said electrode holder and by said workpiece; and pointer means mechanically coupled to said wiper arm means and mounted for longitudinal movement along the external surface of said housing to select the desired welding current, the external surface of said housing containing calibration marks for reading the pointer's position as the desired welding current magnitude as a percentage of the pre-set welding current magnitude; and said machine also containing circuit means responsive to said calibrating current and to said internal control signal for producing said modified remote control signal and applying it to said controlled power supply.

* * * * *